US009995318B2

(12) United States Patent
Magaki et al.

(10) Patent No.: US 9,995,318 B2
(45) Date of Patent: Jun. 12, 2018

(54) HYBRID SHOVEL AND HYBRID SHOVEL CONTROL METHOD

(71) Applicant: SUMITOMO(S.H.I.) CONSTRUCTION MACHINERY CO., LTD., Tokyo (JP)

(72) Inventors: Hideto Magaki, Chiba (JP); Kiminori Sano, Chiba (JP); Ryuji Shiratani, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 498 days.

(21) Appl. No.: 14/700,559

(22) Filed: Apr. 30, 2015

(65) Prior Publication Data

US 2015/0233394 A1 Aug. 20, 2015

Related U.S. Application Data

(63) Continuation of application No. PCT/JP2013/079457, filed on Oct. 30, 2013.

(30) Foreign Application Priority Data

Nov. 8, 2012 (JP) .................................. 2012-246576

(51) Int. Cl.
*F15B 21/00* (2006.01)
*F15B 11/05* (2006.01)
(Continued)

(52) U.S. Cl.
CPC ............ *F15B 11/05* (2013.01); *F15B 11/161* (2013.01); *F15B 15/14* (2013.01);
(Continued)

(58) Field of Classification Search
CPC ....................... F15B 2211/26; F15B 2211/275
See application file for complete search history.

(56) References Cited

U.S. PATENT DOCUMENTS 8,286,741 B2 10/2012 Kawashima
8,874,327 B2 10/2014 Ishihara et al.
(Continued)

FOREIGN PATENT DOCUMENTS

EP 2284322 2/2011
EP 2447119 5/2012
(Continued)

OTHER PUBLICATIONS

International Search Report dated Jan. 21, 2014.

*Primary Examiner* — F. Daniel Lopez
(74) *Attorney, Agent, or Firm* — IPUSA, PLLC

(57) ABSTRACT

A hybrid shovel includes an engine that is controlled at a constant revolution speed, a motor generator that assists the engine, a control part that controls a drive of the motor generator, and a hydraulic pump that is driven by the engine. The control part causes the motor generator to assist the engine when a revolution speed of the engine is lower than the constant revolution speed due to a load of the hydraulic pump. The control part causes the motor generator to decrease an assist output to said engine before the revolution speed of the engine returns to the constant revolution speed.

8 Claims, 6 Drawing Sheets

(51) Int. Cl.
    *F15B 11/16* (2006.01)
    *F15B 15/14* (2006.01)
(52) U.S. Cl.
    CPC .............. *F15B 2211/2053* (2013.01); *F15B 2211/20515* (2013.01); *F15B 2211/20523* (2013.01); *F15B 2211/26* (2013.01)

(56) References Cited

U.S. PATENT DOCUMENTS

2010/0332088 A1  12/2010  Okano et al.
2011/0000722 A1* 1/2011  Kawashima ........... B60K 6/485
                                                      180/65.28
2013/0325268 A1  12/2013  Ishihara et al.

FOREIGN PATENT DOCUMENTS

| JP | 2009-174446 | 8/2009 |
| JP | 2011-012426 | 1/2011 |
| JP | 2012-180683 | 9/2012 |

\* cited by examiner

HYBRID SHOVEL AND HYBRID SHOVEL CONTROL METHOD

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2013/079457 filed on Oct. 30, 2013, designating the U.S., which claims priority based on Japanese Patent Application No. 2012-246576 filed on Nov. 8, 2012. The entire contents of each of the foregoing applications are incorporated herein by reference.

BACKGROUND

Technical Field

The present invention relates to a hybrid shovel that assists an engine by means of an electric motor and a control method thereof.

Description of Related Art

In a shovel, normally, an engine is controlled to maintain a constant revolution speed. When a load of a hydraulic pump is applied to the engine, a fuel injection is performed to increase a torque of the engine so as to perform a control for maintaining the revolution speed of the engine. However, if the load of the hydraulic pump is sharply increased, an increase in the engine torque cannot follow the load increase, and there may be a case where the engine revolution speed is temporarily decreased. In this case, a fuel injection is needed to return the engine revolution speed to the original revolution speed. As a result, not only the fuel consumption is deteriorated but also the engine revolution speed is decreased, and, thereby, the movement of a drive cylinder becomes worse, which results in an occurrence of slowness.

There is suggested a shovel in which an engine is assisted by controlling an assist motor to suppress an occurrence of such a problem. Such a shovel is generally provided with an electric motor (assist motor) that outputs a power for driving a hydraulic pump to assist an engine. Then, it is suggested to return the engine revolution speed to the constant revolution speed by decreasing the engine revolution speed by driving the assist motor to assist the engine even when a load of the hydraulic pump sharply increases.

However, although the engine revolution speed is returned by assisting the engine by the assist motor, if the entire torque to return the engine revolution speed is provided by the assist motor, the engine itself may lose a power to return to the original revolution speed. Thus, the engine torque may always be a torque from which the torque of the assist motor is subtracted, and it may fall into a condition that, if the assist by the assist motor is stopped, the revolution speed is reduced again.

That is, if the engine is assisted by means of the assist motor even though the engine itself can increase the revolution speed, a control to attempt to return the revolution speed by increasing the fuel injection amount of the engine may not be performed.

Thus, it is desirous to develop a technique that can return the revolution speed to the original constant revolution speed by its own effort even when an assist is performed by the assist motor because of a reduction in the engine revolution speed.

SUMMARY

According to an aspect of the present invention, there is provided a hybrid shovel including an engine that is controlled at a constant revolution speed, a motor generator that assists the engine, a control part that controls a drive of the motor generator, and a hydraulic pump that is driven by the engine. The control part causes the motor generator to assist the engine when a revolution speed of the engine is lower than the constant revolution speed due to a load of the hydraulic pump. The control part causes the motor generator to decrease an assist output to said engine before the revolution speed of the engine returns to the constant revolution speed.

There is provided according another aspect of the present invention a control method of a hybrid shovel including an engine that is controlled at a constant revolution speed, a motor generator that assists the engine, a control part that controls a drive of the motor generator, and a hydraulic pump that is driven by the engine. The control method includes assisting the engine by the motor generator when a revolution speed of the engine becomes lower than the constant revolution speed due to a load of the hydraulic pump, and decreasing an assist output by the motor generator to the engine before the revolution speed of the engine returns to the constant revolution speed.

Other objects, features and advantages of the present invention will become more apparent from the following detailed description when read in conjunction with the accompanied drawings.

DETAILED DESCRIPTION

A description will now be given, with reference to the drawings, of embodiments.

Figure 1:
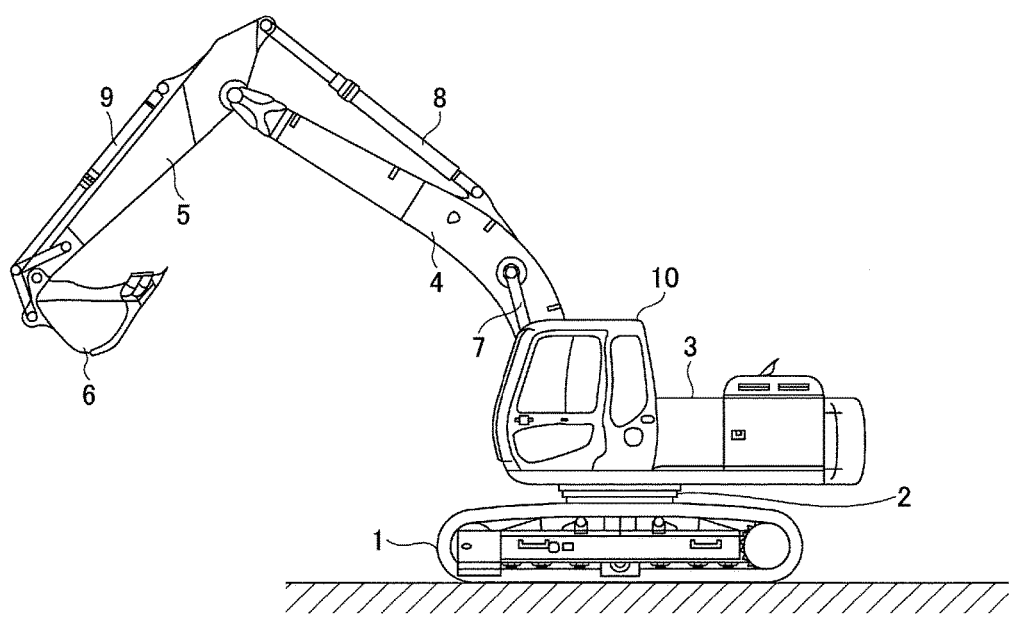
FIG. 1 is a side view of a shovel according to an embodiment.

FIG. 1 is a side view of a shovel to which the present invention is applied.

A lower running body 1 of the shovel illustrated in FIG. 1 is mounted with an upper turning body 3 via a turning mechanism 2. A boom 4 is attached to the upper turning body 3. An arm 5 is attached to an end of the boom 4, and a bucket 6 is attached to an end of the arm 5. The boom 4, arm 5 and bucket 6 are hydraulically driven by a boom cylinder 7, arm cylinder 8 and bucket cylinder 9, respectively. A cabin 10 is provided to the upper turning body 3, and a power source such as an engine or the like is also mounted to the upper turning body 3.

Figure 2:
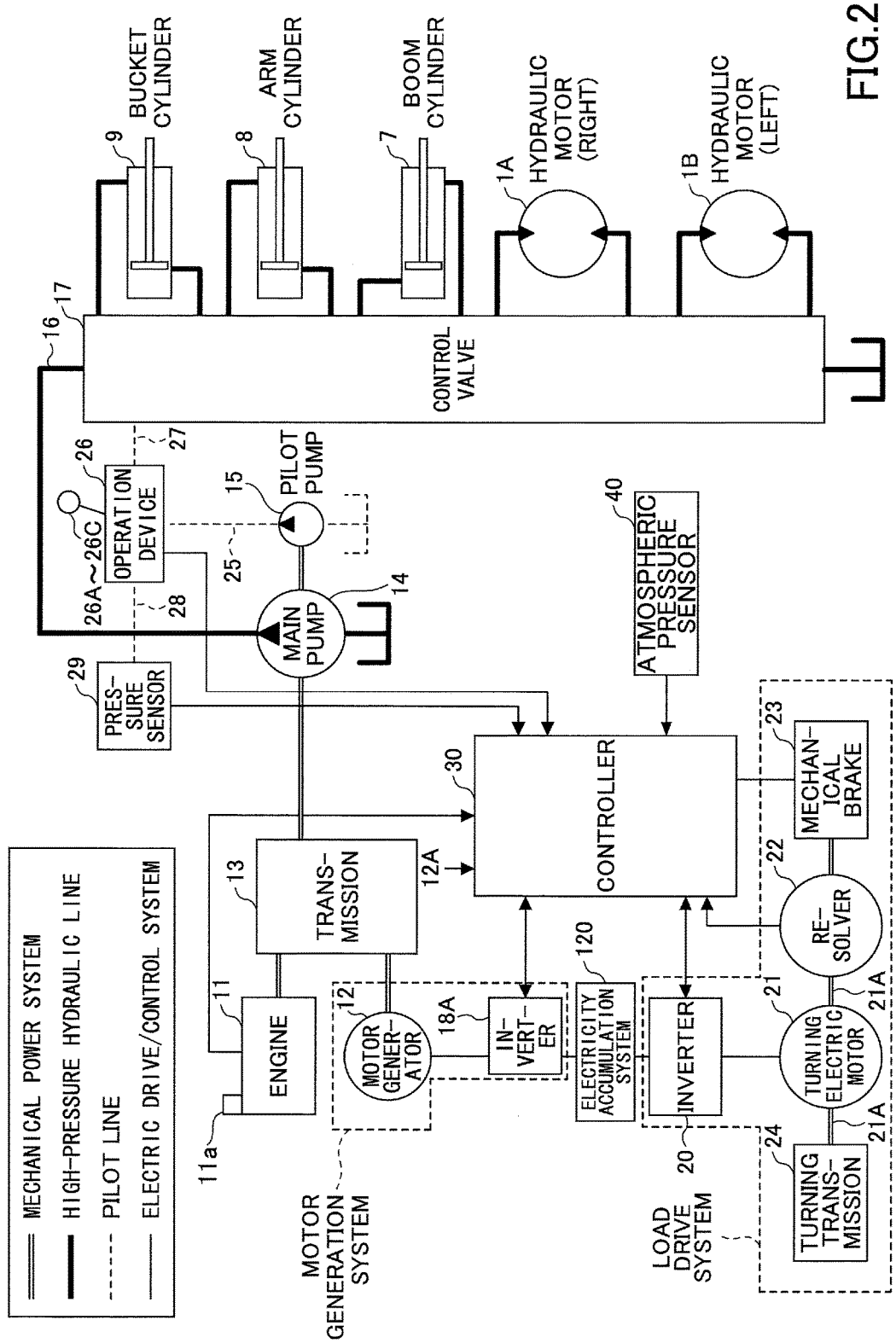
FIG. 2 is a block diagram illustrating a configuration of a drive system of the shovel according to the embodiment.

FIG. 2 is a block diagram illustrating a configuration of a drive system of the shovel illustrated in FIG. 1. In FIG. 2, double lines denote a mechanical power system, bold solid lines denote high-pressure hydraulic lines, dashed lines denote pilot lines, and thin lines denote an electric drive/control system.

An engine 11 as a mechanical drive part and a motor generator 12 as an assist drive part are connected to two input axes of a transmission 13, respectively. An output axis of the transmission 13 is connected with the main pump 14 as a hydraulic pump and a pilot pump 15. The main pump 14 is connected with a control valve 17 though a high-pressure hydraulic line 16. The main pump 14 is a variable capacity hydraulic pump, which can control a discharge flow rate thereof by adjusting a stroke length of a piston by controlling an angle (inclination angle) of a swash plate.

The control valve 17 is a control apparatus for controlling the hydraulic system in the shovel. Hydraulic motors 1A (right) and 1B (left) for the lower running body 1, the boom cylinder 7, the arm cylinder 8 and the bucket cylinder 9 are connected to the control valve 17 through high-pressure hydraulic lines.

An electricity accumulation system 12 including an electricity accumulator is connected to the motor generator 12 through an inverter 18A. Additionally, an operation device 26 is connected to the pilot pump 15 through a pilot line 25. The operation device 26 includes a lever 26A, a lever 26B and a pedal 26C. The lever 26A, lever 26B and pedal 26C are connected to the control valve 17 and a pressure sensor 29 through hydraulic lines 17 and 18, respectively. The pressure sensor 29 is connected to a controller 30 that performs a drive control of an electric system.

The shovel illustrated in FIG. 2 is one in which the turning mechanism 2 is electrically driven, and is provided with a turning electric motor 21 for driving the turning mechanism 2. The turning electric motor 21 as an electrically operating element is connected to the electricity accumulation system 120 through an inverter 20. A rotational axis 21A of the turning electric motor 21 is connected with a resolver 22, a mechanical brake 23 and a turning transmission 24. A load drive system is constituted by the turning electric motor 21, inverter 20, resolver 22, mechanical brake 23 and turning transmission 24.

The controller 30 is a control device as a main control part for performing a drive control of the shovel. The controller 30 is constituted by an operation processing device including a CPU (Central Processing Unit) and internal memories, and is a device materialized by the CPU executing a drive control program stored in the internal memories.

The controller 30 converts a signal supplied from the pressure sensor 29 into a speed command to perform a drive control of the turning electric motor 21. The signal supplied from the pressure sensor 29 corresponds to a signal representing an operation amount when the operation device 26 is operated to cause the turning mechanism 2 to turn.

The controller 30 performs an operation control of the motor generator 12 (switching between an electric motor (assist) operation and a generating operation), and performs a charge/discharge control of a capacitor 19 by drive-controlling an up/down voltage converter 100 (refer to FIG. 3) as an up/down voltage control part. The controller 30 performs a switching control of the voltage-up operation and the voltage-down operation of the up/down voltage converter 100 based on the charge state of the capacitor 19, the operating state of the motor generator 12 (an electric motor (assist) operation or a generating operation) and the operating state of the turning electric motor 21 (a power-running operation or a regenerating operation), thereby performing a charge/discharge control of the capacitor 19. Additionally, the controller 30 computes a state of charge (SOC) of the electricity accumulator (capacitor) based on an electricity accumulator voltage value detected by an electricity accumulator voltage detecting part.

The engine 11 is provided with a tachometer 11a for detecting a revolution speed of the engine 11, and a detection value (revolution speed value) of the tachometer 11a is supplied to the controller 30. The controller 30 always monitors the detection value of the tachometer 11a to control the drive of the motor generator 12 based on the detection value of the tachometer 11a as mentioned later. Note that although a case where the engine and the motor generator are controlled by a single control part is indicated in the present embodiment, if a control part for the engine and a control part for the motor generator are configured by different controllers, the control part for the engine and the control part for the motor generator are included in the control part of the present invention.

Figure 3:
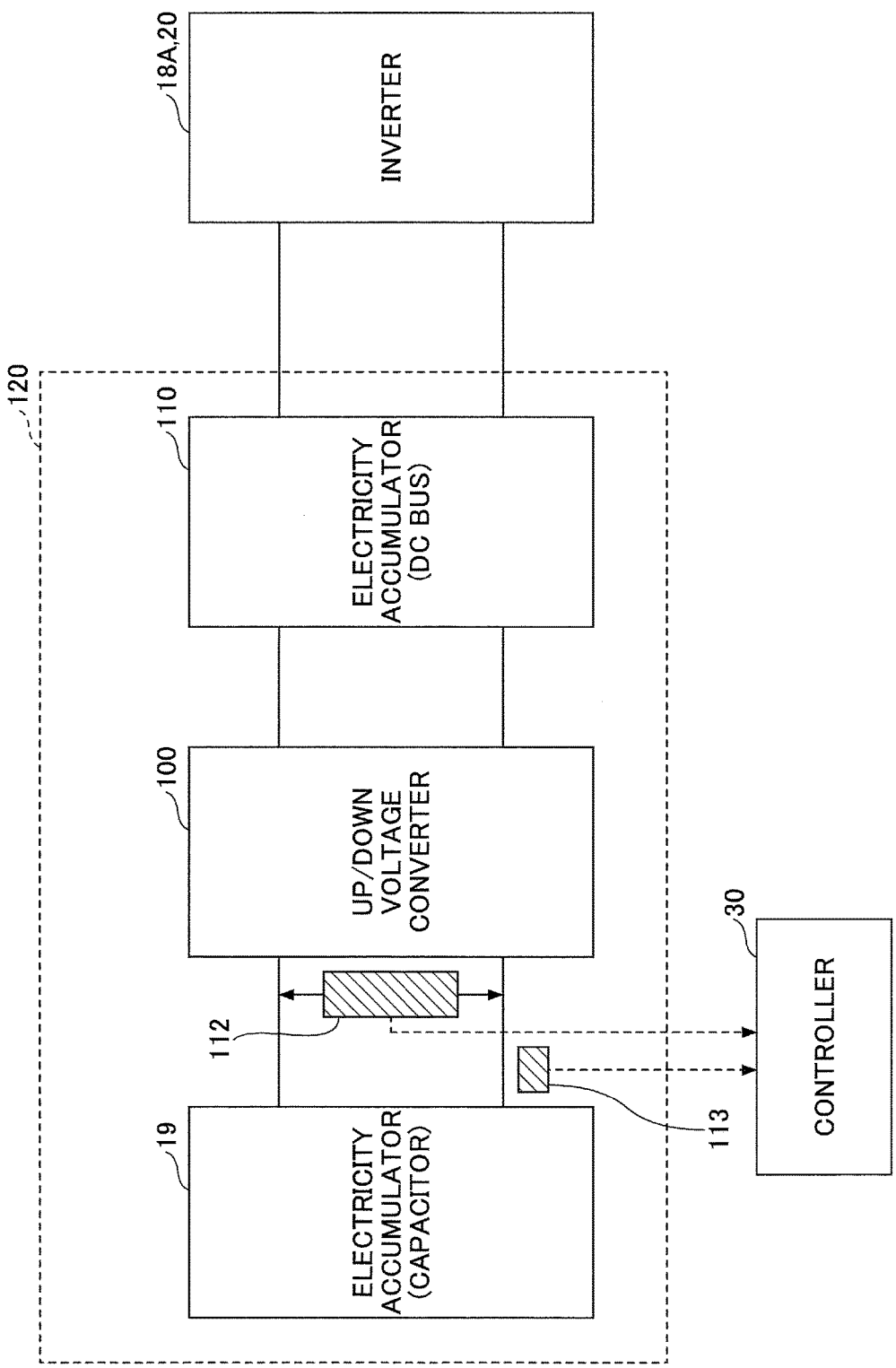
FIG. 3 is a circuit block diagram of an electricity accumulation system.

FIG. 3 is a circuit block diagram of the electricity accumulation system 120. The electricity accumulation system 120 includes the capacitor 19 as an electricity accumulator, the up/down voltage converter 100 and a DC bus 110. The DC bus 110 controls a transfer of an electric power between the capacitor 19, the motor generator 12 and the turning electric motor 21. The capacitor 19 is provided with a capacitor voltage detecting part 112 for detecting a capacitor voltage value and a capacitor current detecting part 113 for detecting a capacitor current value. The capacitor voltage value and the capacitor current value detected by the capacitor voltage detecting part 112 and the capacitor current detecting part 113 are supplied to the controller 30.

The up/down voltage converter 100 performs a control of switching a voltage-up operation and a voltage-down operation in accordance with operating states of the motor generator 12 and the turning electric motor 21 so that a DC bus voltage value falls within a fixed range. The DC bus 110 is arranged between the inverters 18A and 20 and the up/down voltage converter 100, and performs a transfer of an electric power between the capacitor 19, the motor generator 12 and the turning electric motor 21.

The switching control between the voltage-up operation and the voltage-down operation of the up/down voltage converter 100 is carried out based on the DC bus voltage value detected by the DC bus voltage detecting part, the capacitor voltage value detected by the capacitor voltage detecting part 112, and the capacitor current value detected by the capacitor current detecting part 113.

In the above-described configuration, an electric power generated by the motor generator 12, which is an assist motor, is supplied to the DC bus 110 of the electricity accumulation system 120 via the inverter 18A, and, then, supplied to the capacitor 19 via the up/down voltage converter 100. The regenerative electric power generated by the regenerative operation of the turning electric motor 21 is supplied to the DC bus 110 of the electricity accumulation system 120 via the inverter 20, and, then, supplied to the capacitor 19 via the up/down voltage converter 100.

The capacitor 19 may be a chargeable/dischargeable electricity accumulator that enables a transfer of electric power between the capacitor 19 and the DC bus 110 via the up/down voltage converter 100. Note that although the capacitor 19 is used as an electricity accumulator in the present embodiment, a chargeable/dischargeable secondary battery such as a lithium ion battery, a lithium ion capacitor, or a power supply of another form that can transfer an electric power may be used instead of the capacitor 19.

In the shovel of the above-mentioned configuration, a control (a constant revolution speed control) to maintain the revolution speed of the engine 11 at a previously set constant revolution speed when a load is applied or not applied to the engine. The constant revolution speed control of the engine 11 is performed by a control unit (ECU) of the engine 11. In the present embodiment, the constant revolution speed at which the engine 11 is maintained is set to RE1 (for example, 1800 rpm). Then, in the present embodiment, when the revolution speed of the engine 11 is reduced to a revolution speed lower than or equal to a predetermined revolution speed RE2 (for example, 1750 rpm) due to an increase in the load, the engine 11 is assisted by electrically driving the motor generator 12 so as to control the revolution speed of the engine 11 to return to the constant revolution speed RE1. Note that although the control method described below is performed by the controller 30, which controls the entire shovel, in the present embodiment, it is not limited to the controller 30 and an exclusive control part may be provided.

In the present embodiment, when controlling the revolution speed of the engine 11 to return to the constant revolution speed RE1, the motor generator 12 is electrically driven by setting a target revolution speed RM1 of the motor generator 12 to a revolution speed lower than a revolution speed corresponding to the constant revolution speed (a target revolution speed) RE1 of the engine 11. For example, if a ratio of the revolution speed of the motor generator 12 and the revolution speed of the engine 11 at the transmission 13 is 1:N, the target revolution speed RM1 of the motor generator 12 is set to be lower than or equal to a revolution speed acquired by multiplying the constant revolution speed (target revolution speed) RE1 of the engine 11 by N. Additionally, if a ratio of the revolution speed of the motor generator 12 and the revolution speed of the engine 11 at the transmission 13 is 1:1, the target revolution speed RM1 of the motor generator 12 is set to be lower than or equal to the constant revolution speed (target revolution speed) RE1 of the engine 11. In the present embodiment, a description is given on the assumption that the ratio of the revolution speed of the motor generator 12 and the revolution speed of the engine 11 at the transmission 13 is 1:1.

Setting the target revolution speed RM1 of the motor generator 12 to be lower than or equal to the constant revolution speed (target revolution speed) RE1 of the engine 11 is equal to providing a difference between the target revolution speed RE1 of the engine 11 and the target revolution speed RM1 of the motor generator 12. By providing a difference between the target revolution speed RE1 of the engine 11 and the target revolution speed RM1 of the motor generator 12, after the revolution speed of the engine 11 is decreased from the target revolution speed RE1, the revolution speed of the engine 11 can be caused to return to the target revolution speed RE1 by not providing the whole torque necessary to return the engine revolution speed to the target revolution speed RE1 by the output torque of the motor generator 12 but increasing the torque output by the engine 11 by the engine 11 itself.

Figure 4:
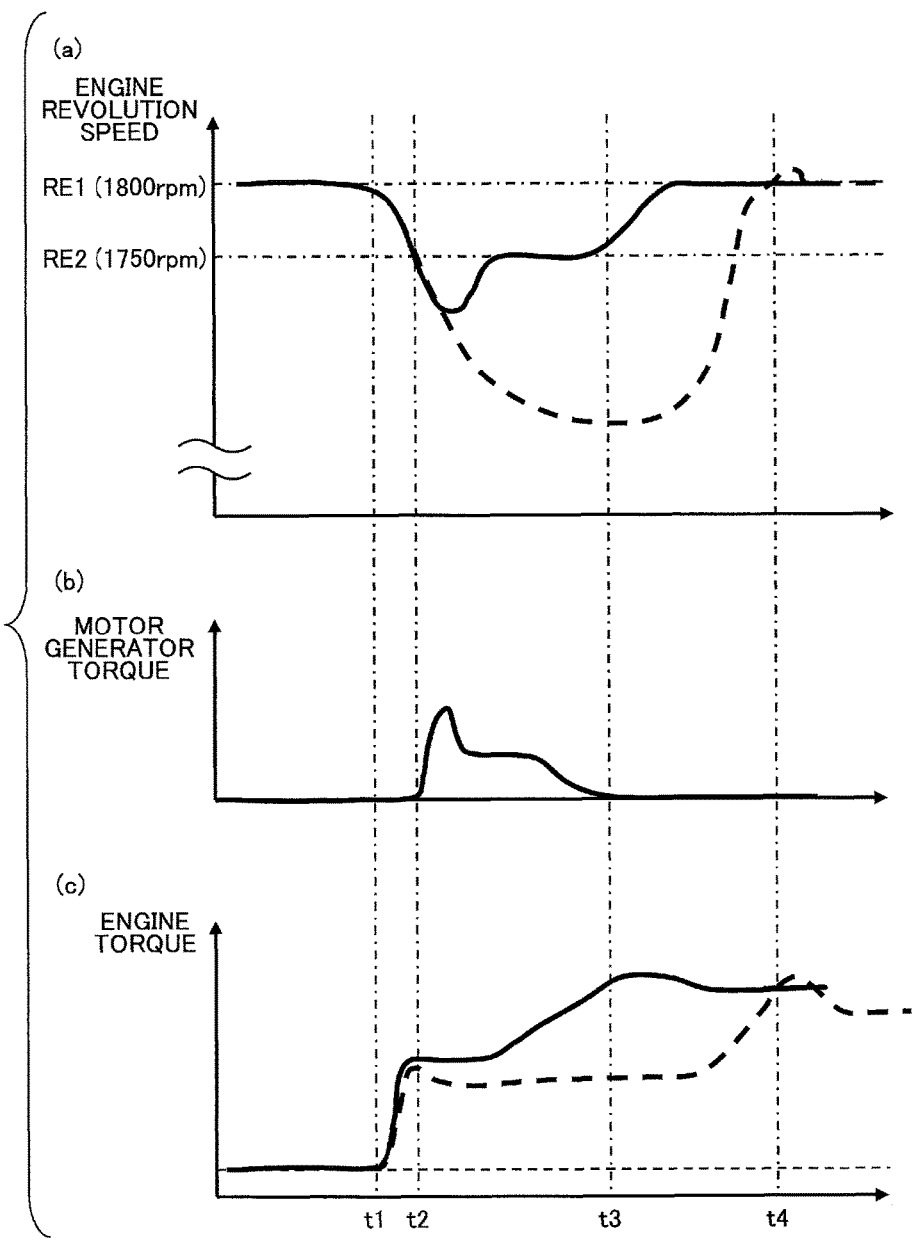
FIG. 4 is a time chart illustrating an example of changes in an engine revolution speed, a torque of a motor generator and a torque of an engine during a period from an execution of an assist by the motor generator when the engine revolution speed is reduced and until the engine revolution speed returns to the original constant revolution speed.

The above-mentioned assist control according to the present embodiment can be achieved by the above-mentioned controller 30, which controls the drive of the shovel, controlling the drive of the motor generator 12. A description is given below of an example of the assist control by the controller 30 according to the present embodiment. Specifically, a description is given, with reference to FIG. 4), of operations of the engine 11 and the motor generator 12 when the above-mentioned assist control is performed. FIG. 4 is a time chart illustrating an example of changes in the revolution speed of the engine 11, the torque of the motor generator 12 and the torque of the engine 11 during a period from an execution of the assist by the motor generator 12 when the revolution speed of the engine 11 is reduced and until the revolution speed of the engine 11 returns to the original constant revolution speed.

FIG. 4-(a) indicates changes in the revolution speed of the engine 11 in which a change in the engine revolution speed when the assist control according to the present example is performed is indicated by a solid line, and a change in the engine revolution speed when the assist control according to the present example is not performed is indicated by a dotted line. FIG. 4-(b) indicates changes in the torque of the motor generator 12. FIG. 4-(c) indicates changes in the torque of the engine 11 in which a change in the engine torque when the assist control according to the present example is performed is indicated by a solid line, and a change in the engine torque when the assist control according to the present example is not performed is indicated by a dotted line.

First, until time t1, the load to the engine 11 is small and the engine 11 is maintained at the constant revolution speed (target revolution speed RE1 (for example, 1800 rpm)). Accordingly, until time t1, the torque of the engine 11 is small as indicated in FIG. 4-(c). Additionally, because there is no need to perform an assist by the motor generator 12, the motor generator 12 does not perform an assist operation, and the torque of the motor generator 12 is zero as indicated in FIG. 4-(b).

Because a load for driving the hydraulic pump (main pump 14) is applied to the engine 11 at time t1, the engine revolution speed starts to go down as indicated in FIG. 4-(a). Because the load applied to the engine 11 is large, the engine revolution speed continuously decreases, and decreases to the previously set setting revolution speed RE2 (for example, 1750 rpm) at time t2. Then, in the present embodiment, the above-mentioned assist control is started. Specifically, the controller 30 monitors the revolution speed value of the engine 11 that is supplied from the tachometer 11a, and when the controller 30 judges that the revolution speed value of the engine 11 becomes lower than or equal to the setting revolution speed RE2, the controller 30 electrically drives the motor generator 12 to start the assist control.

Because the motor generator 12 is caused to perform the electric operation (assist operation) at time t2, the torque of the motor generator 12 sharply increases from time t2 as indicated in FIG. 4-(b). Because the torque of the motor generator 12 is added to the torque of the engine 11 and the drive of the engine 11 is assisted, the decrease in the revolution speed of the engine 11, which has been continuously decreased by being yielded to the load, and the engine revolution speed turns to increase. On the other hand, if the assist control according to the present embodiment is not performed, the revolution speed of the engine 11 does not turn to increase even when time t2 has passed and decreases greatly as indicted by the dotted line of FIG. 4-(a).

When the assist control according to the present example is started at time t2, the engine revolution speed turns to increase, and returns to the setting revolution speed RE2 (for example, 1750 rpm) which is at the time when the above-mentioned assist control is started. Here, in the present example, the target revolution number RM1 of the motor generator 12 is set to the revolution speed corresponding to the above-mentioned setting revolution speed RE2 of the engine 11. In the present example, because the ratio of the revolution speed of the engine 11 and the revolution speed of the motor generator is set to 1:1, the target revolution speed RM1 of the motor generator 12 is set to a revolution speed equal to the setting revolution speed RE2 of the engine 11.

Because the revolution speed of the engine 11 turns to increase when time t2 has passed, and, thereafter, the engine 11 tends to continuously output a torque, the torque of the motor generator 12 turns to decrease as indicated in FIG. 4-(b). Thus, by weakening the assist by the motor generator 12, a load can be given intentionally to the engine 11. As a result, the engine 11 continuously outputs a torque. Then, when the revolution speed of the engine 11 increases up to the setting revolution speed RE2, which is the revolution speed corresponding to the target revolution speed RM1 of the motor generator 12, the motor generator 12 performs an operation to output a torque to maintain the revolution speed thereof. Thus, by reducing the assist force of the motor generator 12 before the revolution speed of the engine 11 returns to the target revolution speed RE1 of the engine 11, the engine 11 can continuously output a torque.

Because the constant revolution speed control of the engine 11 is performed even in the period during which the revolution speed of the engine 11 is maintained at the setting revolution speed RE2, the torque of the engine 11 itself gradually increases as indicated in FIG. 4-(c). With this, the assist by the motor generator 12 becomes unnecessary, the torque of the motor generator 12 is reduced, and the torque of the motor generator 12 becomes zero at time t3. Then, the assist control according to the present example is ended, and the electric operation (assist operation) of the motor generator 12 is stopped.

Because the revolution speed of the engine 11 is still the setting revolution speed RE2 at time t3, which is a revolution speed lower than the target revolution speed RE1, the constant revolution speed control of the engine 11 is performed, which further increases the torque of the engine 11. Thereby, the revolution speed of the engine 11 increases after time t3, and reaches the target revolution speed RE1. That is, the revolution speed of the engine 11 increases to the target revolution speed RE1 only by the constant revolution speed control performed on the engine 11 after time t3 at which the assist by the motor generator 12 is ended. Thus, by reducing the assist force 12 by the motor generator 12 before the revolution speed of the engine 11 returns to the target revolution speed RE1 of the engine 11, the engine 11 can continuously outputs a torque.

After the engine revolution speed reaches the target revolution speed RE1, the engine 11 is merely required to output a torque necessary for maintaining the target revolution speed RE, and, thus, the torque increased after time t3 is slightly reduced, and, thereafter, a constant torque is set.

Note that if the engine revolution speed becomes higher than the setting revolution speed RE2 after time t3 has passed, the revolution speed of the motor generator 12 also becomes higher than the target revolution speed RM1. If the revolution speed of the motor generator 12 is higher than the target revolution speed RM1 as mentioned above, it is possible that the motor generator 12 is controlled to perform a generating operation. If the motor generator 12 performs a generating operation, the load to the engine 11 is increased, which results in applying brake even though the engine revolution speed should be increased further to the target revolution speed RE1. Thus, in the present example, if the engine revolution speed becomes higher than the setting revolution speed RE2 (that is, if the revolution speed of the motor generator 12 becomes higher than the target revolution speed RM1), the motor generator 12 is prevented from performing the generating operation, thereby enabling the engine revolution speed to rapidly increase from the setting revolution speed RE2 to the target revolution speed RE1.

In the case where the assist control according to the present example is not performed, the engine revolution speed continuously decreases after time t2 and the decrease in the engine revolution speed finally stops at time t3 due to the effect of the increase in the fuel injection amount according to the constant revolution speed control. That is, because the increase in the torque by increasing the fuel injection amount of the engine 11 does not have a good response, the engine revolution speed decreases until time t3 even if the constant revolution speed control works after time t1 has passed. On the other hand, the motor generator 12 has a high response as compared to the engine 11, and when the engine revolution speed decreases to the setting revolution speed RE2, the engine revolution speed immediately turns to increase because the torque of the motor generator 12 is applied to the engine 11 in a short time.

In the case where the assist control according to the present example is not performed, the engine revolution speed finally turns to increase after time t3 has passed, and returns to the target revolution speed RE1 at time t4. In the case where the assist control according to the present example is not performed, although the engine revolution speed increases after time t3 has passed in the example illustrated in FIG. 4, if the load applied to the engine 11 is large, the engine revolution speed continuously decreases and the engine 11 may stops in the worst case.

Thus, in the assist control according to the present example, the engine revolution speed is suppressed from being decreased by causing the motor generator 12 to perform an electric operation (assist operation) when the revolution speed of the engine 11 has decreased. In the assist control according to the present example, when the revolution speed of the engine 11 returns to the setting revolution speed RE2, which is lower than the target revolution speed RE1 of the engine 11, the assist by the motor generator 12 is stopped. Thereby, during a period from the setting revolution speed RE2 to the target revolution speed RE1, the engine revolution speed is increased by the torque of the engine 11 itself, which permits the constant revolution speed control of the engine 11 to work appropriately.

On the other hand, if, for example, the engine revolution speed is increased to the target revolution speed RE1 by the assist of the motor generator 12 according to the assist control, there is no need to cause the constant revolution speed of the engine 11 to work. In this case, the assist by the motor generator 12 must be continued to maintain the target revolution speed RE1 even after the engine revolution speed is caused to increase to the target revolution speed RE1, and the constant revolution speed control of the engine 11 cannot be performed appropriately.

Thus, in the assist control according to the present example, the assist by the motor generator 12 is continued until the engine revolution speed increases to the setting revolution speed RE2, which is lower than the target revolution speed RE1 of the engine 11, and, thereafter, the assist is stopped. Thereby, the constant speed control to maintain the target revolution speed RE1 works appropriately, and the target revolution speed RE1 can be maintained by increasing the engine revolution speed to the target revolution speed RE1 by the torque of the engine 11 itself.

Additionally, in the example of the assist control illustrated in FIG. 4, the assist by the motor generator 12 is continued even after the revolution speed of the engine 11 turns from decrease to increase. Specifically, the assist to increase the engine revolution speed is performed until the engine revolution speed returns to the setting revolution speed RE2, which is the engine revolution speed corresponding to the target revolution speed RM1 of the motor generator 12. However, the engine revolution speed may be maintained by the assist using the motor generator 12 so that the engine revolution speed does not decrease to be lower than or equal to a predetermined revolution speed, and the return of the engine revolution speed from the predetermined revolution speed to the target revolution speed RE1 may be achieved according to the constant revolution speed control of the engine 11. That is, the motor generator 12 plays a role of only suppressing the decrease in the engine revolution speed, and the increase in the revolution speed of the engine 11 may be achieved by the constant revolution speed control of the engine 11. A description is given below of another example of the assist control by the controller 30.

Figure 5:
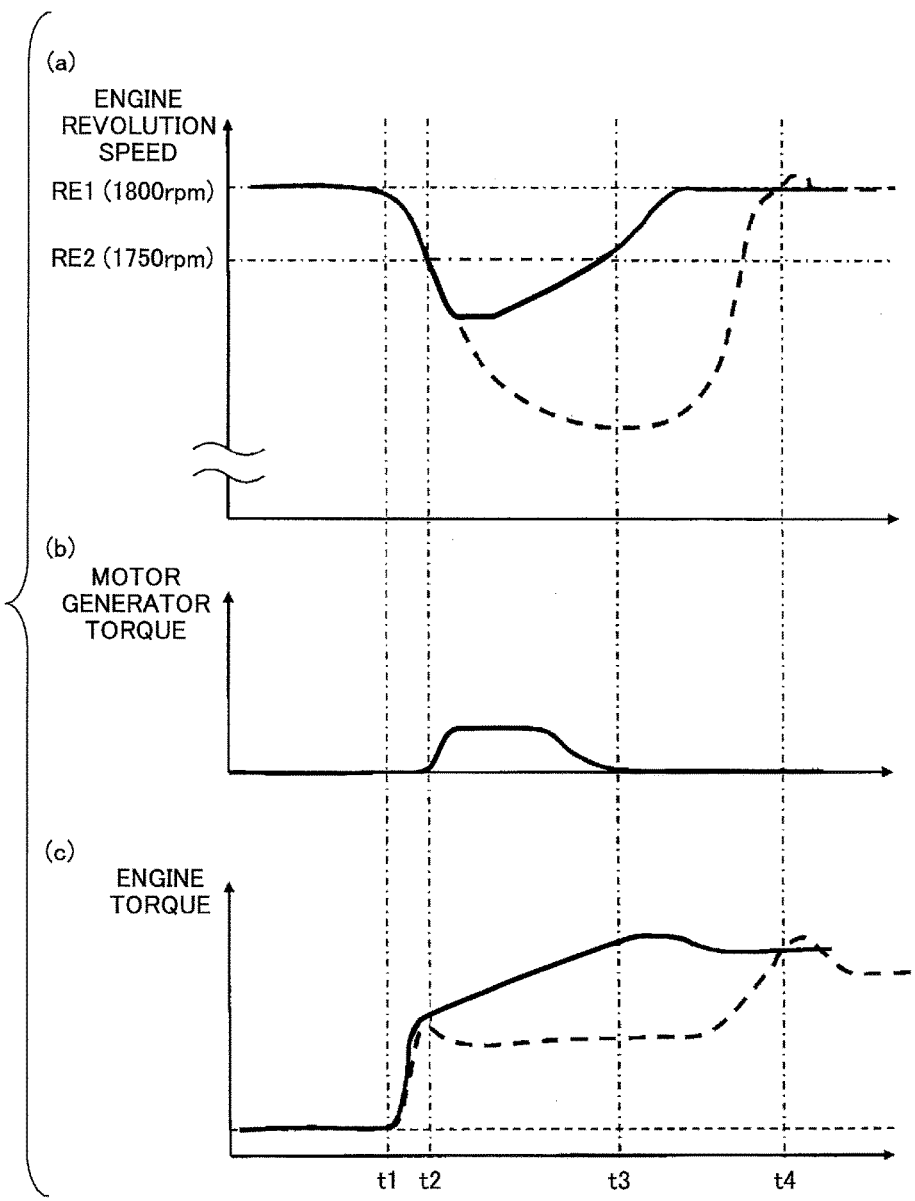
FIG. 5 is a time chart illustrating another example of changes in the engine revolution speed, the torque of the motor generator and the torque of the engine during the period from an execution of an assist by the motor generator when the engine revolution speed is reduced and until the engine revolution speed returns to the original constant revolution speed.

FIG. 5 is a time chart illustrating another example of changes in the revolution speed of the engine 11, the torque of the motor generator 12 and the torque of the engine 11 during a period from an execution of the assist by the motor generator 12 when the revolution speed of the engine 11 is decreased and until the revolution speed of the engine 11 returns to the original constant revolution speed.

FIG. 5-(a) indicates changes in the revolution speed of the engine 11 in which a change in the engine revolution speed when the assist control according to the present example is performed is indicated by a solid line, and a change in the engine revolution speed when the assist control according to the present example is not performed is indicated by a dotted line. FIG. 5-(b) indicates changes in the torque of the motor generator 12. FIG. 5-(c) indicates changes in the torque of the engine 11 in which a change in the engine torque when the assist control according to the present example is performed is indicated by a solid line, and a change in the engine torque when the assist control according to the present example is not performed is indicated by a dotted line.

First, until time t1, the changes are the same as the example of the assist control illustrated in FIG. 4. That is, the load to the engine 11 is small and the engine 11 is maintained at the constant revolution speed (target revolution speed RE1 (for example, 1800 rpm)). Accordingly, until time t1, the torque of the engine 11 is small as indicated in FIG. 5-(c). Additionally, because there is no need to perform an assist by the motor generator 12, the motor generator 12 does not perform an assist operation, and the torque of the motor generator 12 is zero as indicated in FIG. 5-(b).

Additionally, changes from time t1 to time t2 are the same as the example of the assist control illustrated in FIG. 4. That is, because a load for driving the hydraulic pump (main pump 14) is applied to the engine 11 at time t1, the engine revolution speed starts to decrease as indicated in FIG. 5-(a). Because the load applied to the engine 11 is large, the engine revolution speed continuously decreases, and decreases to the previously set setting revolution speed RE2 (for example, 1750 rpm) at time t2. Then, in the present embodiment, the above-mentioned assist control is started. Specifically, the controller 30 monitors the revolution speed value of the engine 11 that is supplied from the tachometer 11a, and when the controller 30 judges that the revolution speed value of the engine 11 becomes lower than or equal to the setting revolution speed RE2, the controller 30 electrically drives the motor generator 12 to start the assist control.

Because the motor generator 12 is caused to perform the electric operation (assist operation) at time t2, the torque of the motor generator 12 sharply increases from time t2 as indicated in FIG. 5-(b). Then, the torque increases to a predetermined torque. Because the torque of the motor generator 12 is added to the torque of the engine 11 and the drive of the engine 11 is assisted, the decrease in the revolution speed of the engine 11, which has been continuously decreased by being yielded to the load, the revolution speed of the engine 11 is suppressed from being decreased. On the other hand, if the assist control according to the present embodiment is not performed, the revolution speed of the engine 11 greatly decreases even when time t2 has passed as indicted by the dotted line of FIG. 5-(a).

When the assist control according to the present example is started at time t2, the torque of the motor generator 12 increases, and when the torque of the motor generator 12 reaches a predetermined torque, the motor generator performs the assist of the drive of the engine 11 by a substantially constant torque. Thereby, the decrease in the revolution speed of the engine 11 stops, and the revolution speed of the engine 11 is maintained substantially constant at a predetermined revolution speed, which is lower than the setting revolution speed RE2. That is, the motor generator 12 may perform the assist of the drive of the engine 11 by the torque necessary for maintaining the revolution speed of the engine 11 at the predetermined revolution speed when the revolution speed of the engine 11 decreases and reaches the predetermined revolution speed.

Here, the constant revolution speed control of the engine 11 is performed even in the state where the decrease in the revolution speed of the engine 11 stops when time t2 has passed and the revolution speed of the engine 11 is maintained substantially constant. Thereby, as illustrated in FIG. 5-(c), the torque of the engine 11 itself continuously increases. Thus, by suppressing the decrease in the engine revolution speed to the predetermined revolution speed to perform the assist control to maintain the engine revolution speed at the predetermined revolution speed, a load can be given intentionally to the engine 11. As a result, the torque of the engine 11 continuously increases, and the revolution speed of the engine 11 starts to increase due to the increased torque of the engine 11.

Additionally, when the revolution speed of the engine 11 starts to increase, the assist by the motor generator 12 becomes unnecessary because the torque to return the revolution speed of the engine 11 to the target revolution speed RE1 is continuously output from the engine 11 according to the constant revolution speed control of the engine 11. Thus, the torque of the motor generator 12 is reduced, and the torque of the motor generator 12 becomes zero at time t3. Then, the assist control according to the present example is ended, and the electric operation (assist operation) of the motor generator 12 is stopped.

As mentioned above, the engine 11 can continuously output a torque by the controller 30 suppressing the decrease in the engine revolution speed to the predetermined revolution speed and performing the assist control using the motor generator 12 to maintain the engine revolution speed at the predetermined revolution speed.

After the assist control according to the present example is ended, the engine revolution speed continuously increases due to the constant revolution speed control of the engine 11, and the engine revolution speed reaches the target revolution speed RE1 after time t3 has passed. After the engine revolution speed reaches the target revolution speed RE1, the torque for merely maintaining the target revolution speed RE1 is required, and the torque slightly decreases after time t3 as illustrated in FIG. 5-(*c*), and, thereafter, set to be a constant torque.

Note that, similar to the example of the assist control illustrated in FIG. 4, if the engine revolution speed becomes higher than the setting revolution speed RE2, the revolution speed of the motor generator 12 also becomes higher than the target revolution speed RM1. Thus, if the engine revolution speed becomes higher than the setting revolution speed RE2 (that is, if the revolution speed of the motor generator 12 becomes higher than the target revolution speed RM1), the motor generator 12 may be prevented from performing the generating operation. Thereby, the engine revolution speed can rapidly increase from the setting revolution speed RE2 to the target revolution speed RE1.

In the case where the assist control according to the present example is not performed, the engine revolution speed continuously decreases after time t2 as illustrated in FIG. 5-(*a*) and the decrease in the engine revolution speed finally stops around time t3 due to the effect of the increase in the fuel injection amount according to the constant revolution speed control. That is, because the increase in the torque by increasing the fuel injection amount of the engine 11 does not have a good response, the engine revolution speed decreases until time t3 even if the constant revolution speed control works after time t1 has passed. On the other hand, the motor generator 12 has a high response as compared to the engine 11, and when the engine revolution speed decreases to the setting revolution speed RE2, the engine revolution speed is immediately prevented from being decreased because the torque of the motor generator 12 is applied to the engine 11 in a short time.

In the case where the assist control according to the present example is not performed, the engine revolution speed finally turns to increase after time t3 has passed, and returns to the target revolution speed RE1 at time t4. In the case where the assist control according to the present example is not performed, although the engine revolution speed increases after time t3 has passed in the example illustrated in FIG. 4, if the load applied to the engine 11 is large, the engine revolution speed continuously decreases and the engine 11 may stops in the worst case.

Thus, in the assist control according to the present example, the engine revolution speed is suppressed from being decreased by causing the motor generator 12 to perform an electric operation (assist operation) when the revolution speed of the engine 11 has decreased. Additionally, in the assist control according to the present example, when the revolution speed of the engine 11 decreases to the predetermined revolution speed, the torque of the motor generator 12 is controlled so that the engine revolution speed is maintained substantially constant at the predetermined revolution speed. Then, the assist by the motor generator 12 is stopped when the revolution speed of the engine 11 starts to increase due to the constant revolution speed control by the engine 11. Thereby, during a period from the above-mentioned predetermined revolution speed to the target revolution speed RE1, the engine revolution speed is increased by the torque of the engine 11 itself, which permits the constant revolution speed control of the engine 11 to work appropriately.

On the other hand, if, for example, the engine revolution speed is increased to the target revolution speed RE1 by the assist of the motor generator 12 according to the assist control, there is no need to cause the constant revolution speed of the engine 11 to work. In this case, the assist by the motor generator 12 must be continued to maintain the target revolution speed RE1 even after the engine revolution speed is caused to increase to the target revolution speed RE1, and the constant revolution speed control of the engine 11 cannot be performed appropriately.

Thus, in the assist control according to the present example, when the engine revolution speed decreases to the predetermined revolution speed, which is lower than the target revolution speed RE1, the engine 11 is assisted so that the engine revolution speed is maintained at the predetermined revolution speed. Then, after the engine revolution speed starts to increase due to the constant revolution speed of the engine 11, the assist is stopped. Thereby, the constant speed control to maintain the target revolution speed RE1 works appropriately, and the target revolution speed RE1 can be maintained by increasing the engine revolution speed to the target revolution speed RE1 by the torque of the engine 11 itself.

Note that, in each example of the assist control illustrated in the above-mentioned FIG. 4) and FIG. 5, the setting revolution speed RE2 may be appropriately determined as an arbitrary revolution speed, which is lower than the target revolution speed RE1, if it is a revolution speed at which the constant revolution speed control of the engine 11 works. Additionally, although the assist control is started when the revolution speed of the engine 11 starts to decrease and becomes lower than or equal to the setting revolution speed RE2 (at time t2) in the above-mentioned each example, the setting revolution speed RE2 is not always set as a reference. For example, the start of the assist control may be judged using a revolution speed, which is lower than the setting revolution speed RE2, as a reference.

Although the description has been given above in detail of the modes for carrying out the present invention, the present invention is not limited to the specific embodiments, and various alterations and changes may be made within the scope of the present invention.

Figure 6:
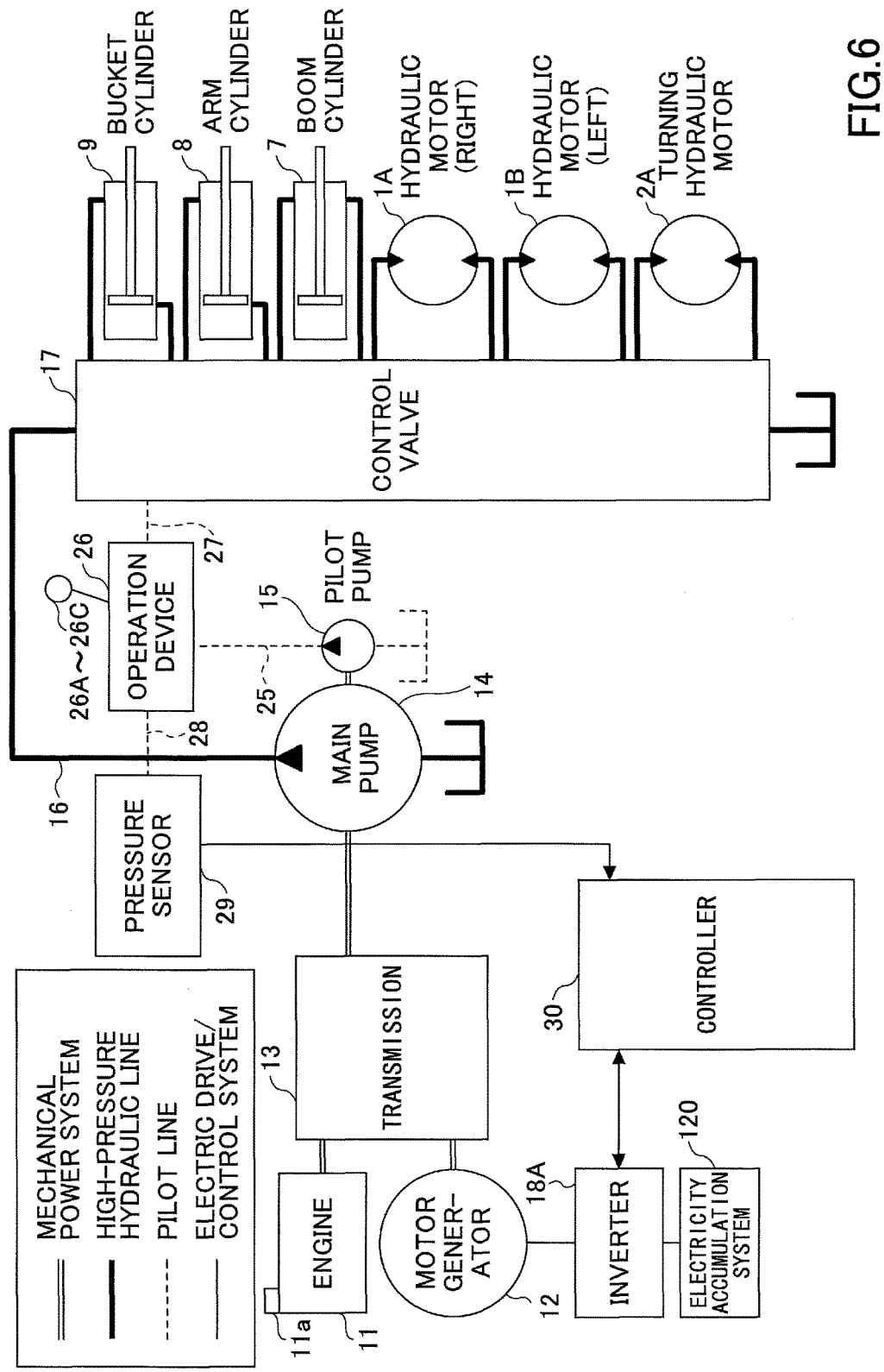
FIG. 6 is a block diagram illustrating a configuration of a drive system of a shovel in which a turning mechanism is driven by a turning hydraulic motor.

For example, although the turning mechanism 2 is of an electrically driven type in the above-mentioned embodiments, there may be a case where the turning mechanism 2 is not electrically driven by hydraulically driven. FIG. 6 is a block diagram illustrating a configuration of a drive system in a case where the turning mechanism of the shovel illustrated in FIG. 2 is made to be a hydraulically driven type. In the shovel illustrated in FIG. 6, a turning hydraulic motor 2A is connected to the control valve 17 instead of the turning electric motor 21, and the turning mechanism 2 is driven by the turning hydraulic motor 2A. Also the shovel having the above-mentioned configuration, similar to the above-mentioned embodiments, the constant revolution speed control to maintain the target revolution speed RE1 works appropriately, and the target revolution speed RE1 can be maintained by causing the revolution speed to increase to the target revolution speed RE1 by the torque of the engine 11 itself.

The present invention is not limited to the specifically disclosed embodiments using the above-mentioned shovel as an example, and various variations and modifications may be made without departing from the scope of the present invention.

What is claimed is:
1. A hybrid shovel, comprising:
an engine that is controlled at a constant revolution speed;
a motor generator that assists the engine;
a control part that controls a drive of said motor generator; and a hydraulic pump that is driven by said engine, wherein said control part causes said motor generator to assist said engine when a revolution speed of said engine is lower than said constant revolution speed due to a load of said hydraulic pump, and said control part causes said motor generator to decrease and stop an assist output to said engine before the revolution speed of said engine returns to said constant revolution speed.

2. The hybrid shovel as claimed in claim 1, wherein said control part sets, during the assist of said engine by said motor generator, a target revolution speed of said motor generator to a value lower than a revolution speed corresponding to said constant revolution speed.

3. The hybrid shovel as claimed in claim 1, wherein said control part starts the assist of said engine by said motor generator when a detected value of the revolution speed of said engine becomes lower than or equal to a revolution speed corresponding to a target revolution speed of said motor generator, and said control part causes said motor generator to stop the assist output to said engine when the detected value of the revolution speed of said engine becomes higher than the revolution speed corresponding to the target revolution speed of said motor generator and reaches a predetermined revolution speed that is lower than the revolution speed corresponding to said constant revolution speed.

4. The hybrid shovel as claimed in claim 1, wherein, when the revolution speed of said engine becomes lower than said constant revolution speed and reaches a predetermined revolution speed, which is lower than said constant revolution speed, said control part performs the assist of said engine by said motor generator to maintain the revolution speed of said engine at the predetermined revolution speed.

5. The hybrid shovel as claimed in claim 1, wherein, when said motor generator is assisting said engine and when a detection value of the revolution speed of said engine is higher than a revolution speed corresponding to a target revolution speed of said motor generator, said control part prohibits said motor generator from performing a generating operation.

6. The hybrid shovel as claimed in claim 1, wherein said control part controls an output of said engine to increase while controlling the revolution speed of said motor generator based on a target revolution speed.

7. The hybrid shovel as claimed in claim 1, wherein said control part sets, during the assist of said engine by said motor generator, a target revolution speed of said motor generator such that there is a difference between the target revolution speed and said constant revolution speed.

8. A hybrid shovel, comprising:
an engine that is controlled at a constant revolution speed;
a motor generator that assists the engine;
a control part that controls a drive of said motor generator; and
a hydraulic pump that is driven by said engine,
wherein said control part causes said motor generator to assist said engine when a revolution speed of said engine is lower than said constant revolution speed due to a load of said hydraulic pump, and said control part causes said motor generator to decrease an assist output to said engine before the revolution speed of said engine returns to said constant revolution speed,
wherein said control part sets a target revolution speed of said motor generator to a value lower than a revolution speed corresponding to said constant revolution speed, and said control part maintains the revolution speed of said motor generator at said target revolution speed when the revolution speed of said motor generator reaches said target revolution speed during the assist of said engine by said motor generator.

* * * * *